UNITED STATES PATENT OFFICE.

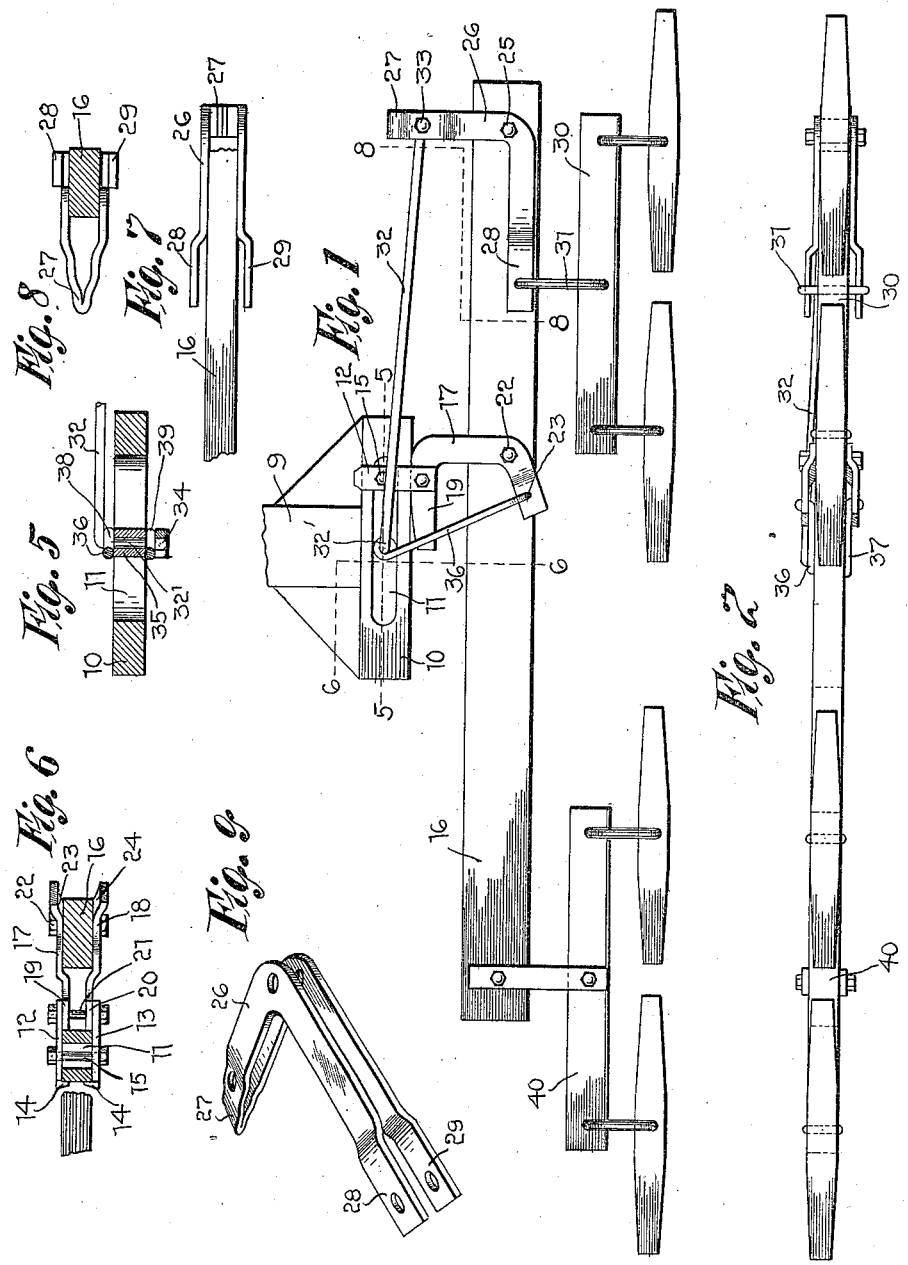

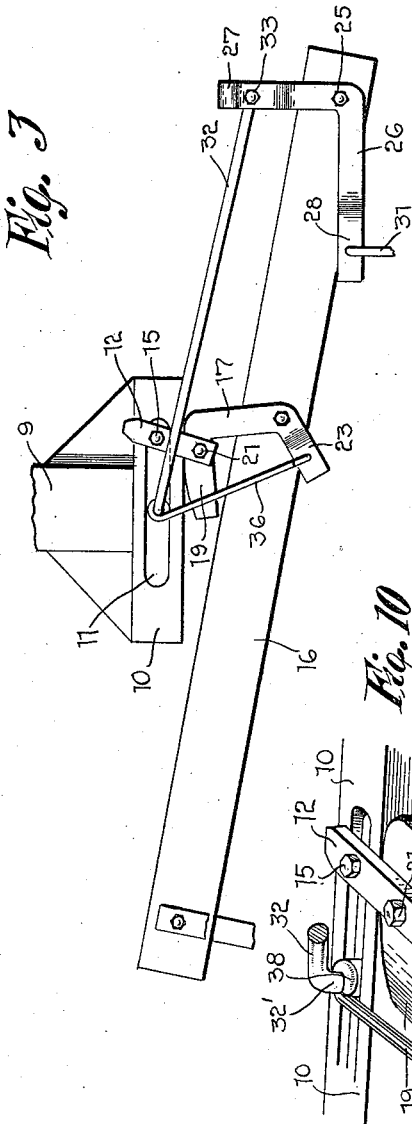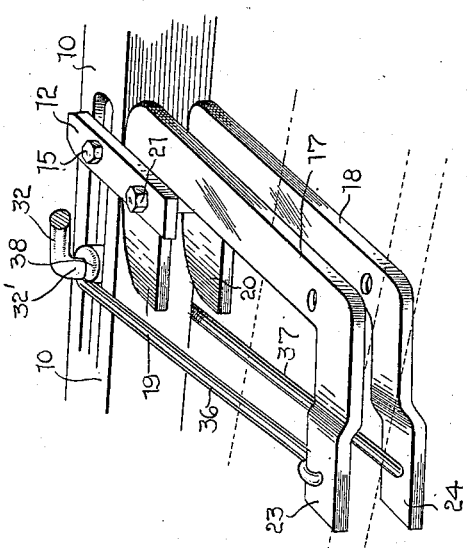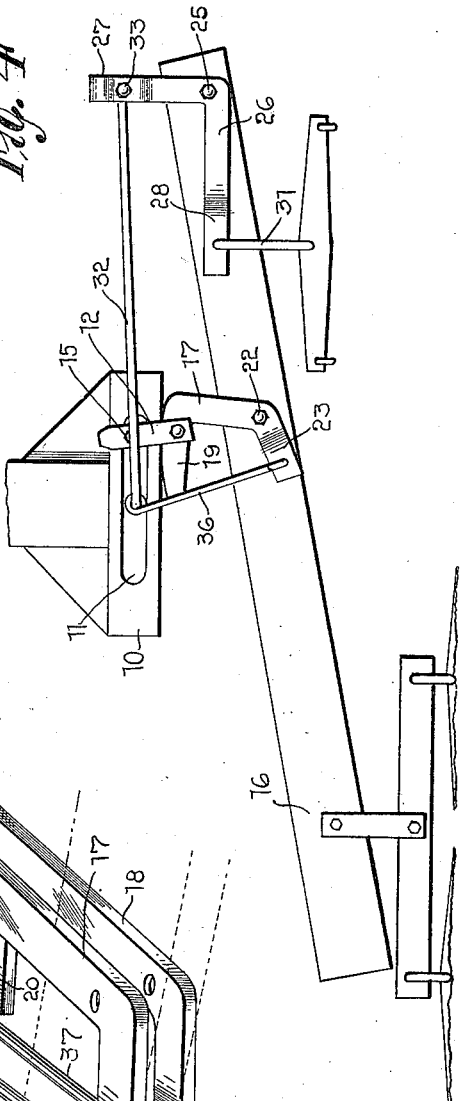

LOUIS P. HESEMAN, OF IRVINGTON, ILLINOIS.

COMBINED HORSE-HITCH.

1,041,469.   Specification of Letters Patent.   Patented Oct. 15, 1912.

Application filed June 13, 1911. Serial No. 632,910.

*To all whom it may concern:*

Be it known that I, LOUIS P. HESEMAN, a citizen of the United States, residing at Irvington, in the county of Washington and State of Illinois, have invented certain new and useful Improvements in Combined Horse-Hitches, of which the following is a specification, reference being had therein to the accompanying drawing.

This invention relates to draft attachments for sulky plows or cultivators or the like, and has for its object the production of a draft attachment which may be attached to a sulky plow or the like for preventing the crowding of draft animals while plowing a field, the crops of which have been sown in rows.

Another object of this invention is the production of a draft attachment for allowing one draft animal or set of draft animals to be attached to one side of a central beam for a considerable distance so that said draft animal or set of draft animals may travel between the adjacent rows, where the crops have been sown in rows.

In carrying out the objects of the invention, generally stated above, it will be understood, of course, that the essential features thereof are susceptible to changes in details and structural arrangements, one preferred and practical embodiment being disclosed in the accompanying drawings, wherein:—

Figure 1 is a top plan view constructed in accordance with the invention. Fig. 2 is a view in front elevation thereof. Fig. 3 is a plan view showing the draft applied to one end of the main tree. Fig. 4 is a plan view showing the draft applied to the opposite end of the main tree. Fig. 5 is a longitudinal section on line 5—5 of Fig. 1. Fig. 6 is a transverse section on line 6—6 of Fig. 1, the connecting rods not being shown. Fig. 7 is a front elevation of the angle iron pivoted to one end of the double tree, said double tree being partly broken away. Fig. 8 is a transverse section on the line 8—8 of Fig. 1, the connecting rod not being shown. Fig. 9 is a detail perspective view of the connecting clip for the double tree. Fig. 10 is a detail perspective view of the means for connecting the main tree to the plow beam.

Referring to the accompanying drawings, 9 represents the beam of a plow, to the end of which is securely attached transversely a strip 10 provided with a longitudinally extending slot 11. Transversely across the top and bottom of the strip 10 are plates 12 and 13 which are provided on their inner ends with clips 14 constituting fulcrums for engaging the rear of said strip 10 thereby allowing a swinging movement but preventing any forward movement of said plates. These plates 12 and 13 are further held in engagement with the strip 10 by means of a bolt 15 which is secured to the plates and passes through the wide longitudinal slot 11. This wide slot 11 will allow the bolt 15 to have a lateral swing and thereby allow a lateral swing of the plates 13 upon the beam 9.

A main tree 16 is connected to the strip 10 by means of a pair of connecting plates 17 and 18 which have their inner ends 19 and 20 bent at right angles to the body of the plates and which abut against the outer longitudinal edge of the strip 10 thereby allowing said ends to rock upon the outer edge of said strip 10 as said plates 17 and 18 are swung. The ends 19 and 20 are interposed between the ends of the plates 12 and 13 and a bolt 21 is passed through said ends and secured in position. The double tree 16 is pivoted to the plates 17 and 18 by means of a pivot bolt 22 which passes therethrough. The ends 23 and 24 of the plates 17 and 18 are bent at an angle to the body of said plates and are also flared outwardly adjacent their extremities in order that said ends will be in spaced relation to the double tree 16.

Adjacent one of the ends of the double tree is pivoted by means of a bolt 25, an angle iron 26 that engages both the top and bottom of said double tree. The connected end 27 of the angle iron 26 tapers by degrees and the other ends 28 and 29 flare outwardly at their extremities. A double tree 30 is pivotally connected to the ends 28 and 29 by means of a rod 31.

A connecting rod 32 has one end secured within the tapered end 27 of the angle iron 26 by a bolt 33. The other end 32′ of said rod 32 is bent at right angles thereto and extends into the slot 11 of the strip 10 and is threaded to receive a nut 34. A collar 35 engages the bent end of the rod 32 and is adapted to keep in spaced relation a pair of connecting rods 36 and 37 that have their ends 38 and 39 turned about the end 32′ of the rod 32. The other ends of the rods 36 and 37 engage with the flaring ends of the plates 17 and 18, thus forming a connection between said plates and the angle iron 26.

At the other end of the main tree from that which the equalizing means is attached, a double tree 40 is connected to said main tree.

It will be understood from the foregoing description that when the main tree is rocked the connecting rods will cause the different levers to take the positions as shown in Figs. 3 and 4 of the drawings.

In Fig. 4 I have shown my draft appliance as a three-horse evener, and, of course, it should be readily understood that the device may be varied to accommodate different numbers of horses without departing from the spirit of the invention.

It should be understood that the present device is capable of being used in connection with gang or sulky plows.

Having thus described my invention, what is claimed is:—

A horse hitch adapted to be attached to a plow for allowing a number of draft animals to be attached thereto without danger of injury to the corn or other vegetables planted in the field, comprising a beam provided with a transverse slot, a main tree pivotally connected to said beam, equalizing means carried by one end of said main tree, a rod attached to said equalizing means and provided with a straight angular projection extending in said slot a connecting rod engaging said first mentioned rod, connecting plates pivotally secured to said main tree and also pivotally connected to said beam, said equalizing means extending toward the center of said beam for allowing a tree to be attached substantially in front of said beam, whereby one horse may be allowed to travel so as to be out of the path of the rows of corn, said beam extending to one side of said connecting plates for allowing the second draft animal to be attached thereto whereby said animal may effectually assist in drawing the plow while being placed a considerable distance to one side of said beam.

In testimony whereof I hereunto affix my signature in presence of two witnesses.

LOUIS P. HESEMAN.

Witnesses:
 H. C. HESEMAN,
 M. E. HOHMAN.